Nov. 25, 1969  KARL-HEINZ HILDEBRAND  3,480,543
PROCESS AND APPARATUS FOR DISINFECTION OF SEWAGE
Filed May 26, 1967
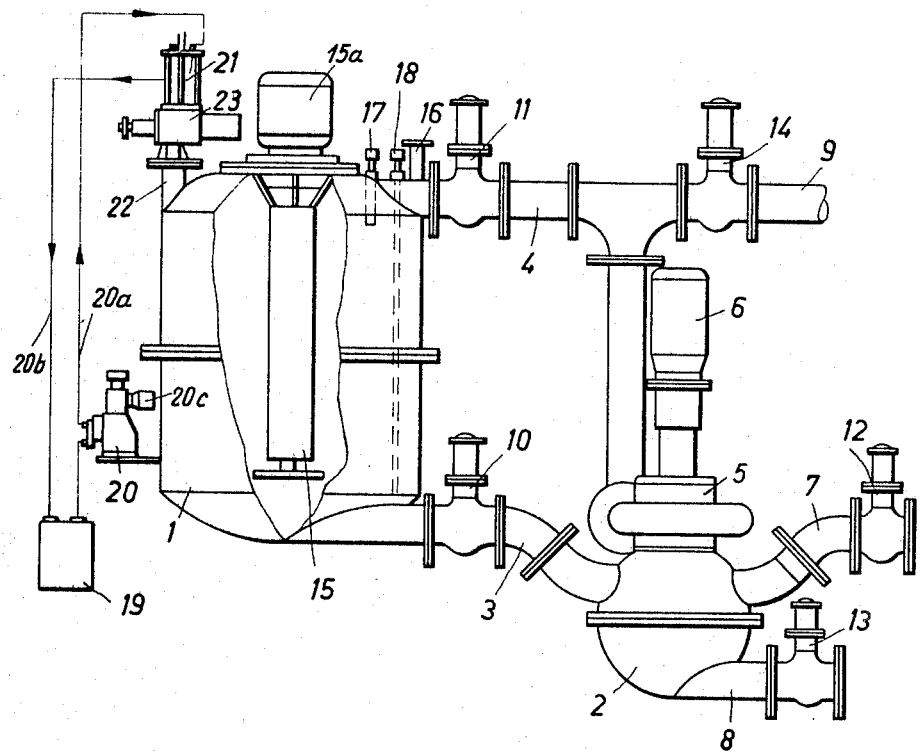
Inventor:
Karl-Heinz Hildebrand
By Michael S. Striker
Attorney

United States Patent Office 3,480,543
Patented Nov. 25, 1969

3,480,543
PROCESS AND APPARATUS FOR DISINFECTION OF SEWAGE
Karl-Heinz Hildebrand, Sommerstrasse 53,
Fachbach, near Bad Ems, Germany
Filed May 26, 1967, Ser. No. 641,544
Claims priority, application Germany, May 28, 1966,
H 59,550
Int. Cl. B01d 21/01
U.S. Cl. 210—60    10 Claims

ABSTRACT OF THE DISCLOSURE

Apparatus for treatment of sewage with chlorine. Comprises a hydraulic circuit wherein a batch of sewage is circulated by a pump which simultaneously serves as a means to comminute certain solid ingredients. An agitator provided in a tank which forms part of the hydraulic circuit serves to mix sewage with air, and a feeding device dumps measured amounts of chlorine into the tank so that the circulating sewage is disinfected within a matter of seconds. Unbreakable solids of high specific weight accumulate in a second tank of the hydraulic system and are sterilized by the circulating fraction of sewage. The solids accumulating in the second tank can be evacuated by gravity or by attendants. An electric control system regulates the operation of valves, motors for the pump and agitator, and the operation of the feeding device.

Background of the invention

The present invention relates to a process and apparatus for disinfection of sewage, particularly for disinfection of sewage in hospitals, ships, schools and like institutions.

It is already known to sterilize sewage by extended heating or by addition of suitable chemicals, particularly chlorine. Such presently known processes are unsatisfactory when the sewage contains a relatively high percentage of solids, for example, human or animal excrements, bandages, napkins and others. The solid ingredients are notorious carriers of bacteria and viruses, and their sterilization by heat or by simple admission of chemicals into a batch of sewage is very unsatisfactory. Therefore, disinfection with chlorine normally requires the utilization of very large quantities of disinfectant and long-lasting interaction between disinfectant and sewage. Consequently, such conventional processes are quite uneconomical and they often produce disinfected sewage which contains undesirably high quantities of chlorine.

Summary of the invention

It is an important object of my invention to provide a novel and improved process for rapid, efficient and economical disinfection of sewage with chlorine or the like.

Another object of the invention is to provide a process of the just outlined character which can bring about satisfactory sterilization of sewage by resorting to relatively small amounts of chlorine.

A further object of the instant invention is to provide a process which is particularly suited for disinfection of sewage accumulating on ships, in hospitals or like institutions and which can be utilized for efficient sterilization of sewage which contains relatively large percentages of breakable or unbreakable solid ingredients.

A concomitant object of the invention is to provide a novel and improved apparatus which can be utilized in the practice of the above outlined method and which can be operated automatically, semiautomatically, continuously, intermittently, as well as on water or on land.

One feature of my invention resides in the provision of a process for treatment of sewage with a disinfectant, particularly with chlorine. The process comprises the steps of circulating a batch of sewage in an endless path a portion of which forms an aerating chamber, mixing the circulating sewage with air, and admitting a measured amount of disinfectant into the resulting circulating mixture of air and sewage. The endless path preferably further includes a smaller second chamber through which the batch of sewage is admitted and evacuated by gravity feed.

If the sewage contains comminutible solid ingredients, the process preferably further includes the step of comminuting the solid ingredients at least during admission of sewage into the circuit. Such comminuting step may be continued during the entire period of circulation of sewage and may be brought about by a separate comminuting device or by a special circulating pump which draws sewage into and circulates such sewage in the endless path.

If the sewage contains solid ingredients of relatively high specific weight, for example, particles of vitreous or metallic material which are hard to comminute, the process preferably further includes the steps of effecting settling of solid ingredients in a second portion of the endless path and circulating the remainder of sewage past and in continuous contact with settled ingredients so that such ingredients are rinsed with aerated flowable sewage and thereupon by sewage which contains a requisite amount of disinfectant.

The aforementioned second chamber is preferably a settling chamber and may extend to a level below the remainder of the endless path to collect the ingredients of high specific weight.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawing.

Brief description of the drawing

The single figure of the drawing is a partly elevational and partly sectional view of a disinfecting apparatus which embodies my invention.

Description of the preferred embodiment

The drawing illustrates an apparatus for treatment of sewage with a disinfectant, preferably with chlorine. This apparatus comprises a hydraulic circuit which defines an endless path for circulation of successive batches of sewage and includes a larger tank 1, a smaller tank 2, a first conduit 4 which connects the upper portion of the smaller tank 2 with the upper portion of the larger tank 1, and a second conduit 3 which connects the lower portion of the tank 1 with an intermediate portion of the tank 2. The smaller tank 2 has an internal settling chamber of spherical outline which constitutes a portion of the aforementoned endless path. This chamber can receive untreated sewage through an inlet 7 which is connected with the top part of the tank 2 and is controlled by a second electrically operated valve 13. The outlet 8 is in communication with the bottom part of the spherical chamber in the tank 2.

The circulating means for causing sewage to flow in the endless path defined by the tanks 1, 2 and conduits 3, 4 includes a rotary pump 5 which is driven by an electric motor 6. The pump is installed in or on the tank 2 and serves to draw sewage through the inlet 7 as well as to circulate sewage in the hydraulic circuit so that the sewage flows through the conduit 4, through the tank 1, through the conduit 3, through the tank 2, and back into the conduit 4. It will be noted that the conduit 4 connects the upper portions of the tanks 1 and 2.

The pump 5 is preferably constructed in such a way that on the axis of its rotary part a comminuting device is fixed which automatically comminutes or breaks up comminutible solid ingredients in the sewage fed by the pump, for example, human or animal excrements, sanitary napkins, plaster and the like. Alternatively, the motor 6 or another prime mover may drive a separate rotary or otherwise movable cutter or analogous comminuting device disposed in the sewage fed by the pump for breakable solid ingredients of the sewage.

A second outlet 9 is provided in the conduit 4 and contains an electrically operated valve 14. Additional electrically operated valves 10, 11 are respectively installed in the conduits 3 and 4. All of the valves are preferably of the quick-closing type.

The chamber of the larger tank 1 accommodates a vertical agitator or mixer 15 which is driven by an electric motor 15a and serves to admix air to circulating sewage. To this end, the tank 1 comprises a venting pipe 16. The tank 1 further carries two level detectors in the form of electrodes 17, 18. The electrode 18 extends into the bottom part and the electrode 17 extends into the top part of the agitating chamber in the tank 1.

The apparatus also comprises a feeding unit including a source 19 of disinfectant, a small adjustable pump 20 which can draw disinfectant from the source 19, and a measuring vessel 21 which receives disinfectant from the outlet of the pump 20 through a supply pipe 20a. The pump 20 can be driven by a motor 20c. A return or overflow pipe 20b connects the vessel 21 with the source 19 so that the vessel can accommodate only a measured amount of disinfectant. The remaining disinfectant overflows through the pipe 20b and returns to the source 19. The disinfectant may be sodium hypochlorite or chlorine water. The vessel 21 is mounted on an electrically controllable valve 23, which is mounted on a tube 22 open to the tank 1. The valve may have the form of a flap so that by opening the disinfectant contained in the vessel 23 dumps into the tank all at once.

The operation is as follows:

The valves 10, 13 and 14 are closed by an electric control system which regulates the operation of valves 10–14, motors 6, 15a, 20c, and the drive 21. The valves 11 and 12 are open. The motor 6 is started so that the pump 5 draws untreated sewage through the inlet 7 and conveys such sewage through the conduit 4 and into the tank 1. The inlet 7 is connected to the sewage collecting tank in a ship or hospital. When the level of sewage in the tank 1 reaches the electrode 17, the electric control system closes the valve 12 in the inlet 7 and opens the valve 10 in the conduit 3. The hydraulic circuit then accommodates a predetermined batch or mass of untreated sewage. For example, the capacity of the tank 1 may be about 400 liters and the motor 6 can be arranged to effect admission of 400 liters of sewage in about 20 seconds.

As soon as the valve 10 in the conduit 3 opens, the pump 5 can circulate the sewage through the chamber of the tank 2, via conduit 4, agitating chamber of the tank 1 and conduit 3. The motor 15a is started simultaneously with opening of the valve 11 so that the agitator 15 mixes the circulating sewage with air and greatly increases the surface area of sewage. The pump 5 or a separate comminuting device automatically comminutes breakable solid ingredients of the sewage, not only during initial admission of sewage into the tank 1 but also while the sewage circulates in the endless path defined by the parts 1–4. Such comminutible ingredients may include human or animal excrements, sanitary napkins, bandages and other disposable solids which can be found in sewage coming from ships or hospitals. Unbreakable or hard-to-break solid ingredients of relatively high specific weight (for example, metallic particles or particles or broken glass, ceramic or the like) which are heavier than the remainder of sewage will settle in the lower part of the chamber in the tank 2 which latter extends to a level below the remainder of the hydraulic circuit. It will be noted that the discharge end of the conduit 3 communicates with a median portion of the tank 2 so that the circulating fraction of sewage can rinse and eventually agitate the settled solids but cannot compel such solids to leave the tank 2. The spherical configuration of the tank 2 contributes to highly satisfactory rinsing action.

The motor 20c of the pump 20 is started while the agitator 15 mixes sewage with air so that the pump 20 conveys disinfectant from the source 19 into the vessel 21. The pump 20 can be arrested by a suitable timer or continues to operate so that the disinfectant overflows from the vessel 21 and returns to the source 19 through the return pipe 20b. The overflow may be regulated so that the vessel 21 contains such amount of disinfectant sufficient to completely sterilize the sewage contained in the apparatus.

The aforementioned electric control system will open the valve 23 to suddenly dump the contents of the vessel 21 into the tank 1 after a predetermined interval following starting of the motors 6 and 15a, i.e., after the agitator 15 has brought about satisfactory aeration of circulating sewage and after the pump 5 has comminuted all comminutible solids in such sewage. For example, the setting of the valve 23 may be such that the vessel 21 suddenly dumps its contents 2–4 minutes after starting of the motor 15a. At the same time, the control system shuts off the motor 20c of the pump 20. The agitator 15 continues to agitate sewage in the tank 1 and the pump 5 continues to circulate sewage so that the disinfectant can kill all bacteria and viruses within a matter of a few seconds. It was found that such mode of disinfection is effective up to substantially 100 percent.

The comminuting action of the pump 5 (or of a separate comminuting device) contributes significantly to highly satisfactory disinfecting action. This will be readily understood since the disinfectant can reach all comminuted fragments of solids which were broken up during repeated passage through the pump 5. The solids which settle in the chamber of the tank 2 are disinfected with equal efficiency because they are continuously rinsed, first by a mixture of sewage and air and thereupon by sewage which contains a requisite amount of disinfectant. Fragments of glass or metal require only external disinfection.

The pump 5 and agitator 15 will continue to operate for a certain period of time following sudden admission of disinfectant, e.g., for a period of 2–5 minutes. The control system then arrests the motor 15a and returns the vessel 21 to normal position. The tank 1 may be provided with a sealable window which admits disinfectant from the vessel 21.

If the treated sewage is to be evacuated by gravity flow, the pump 5 is brought to a halt and the control system opens the valve 13 in the outlet 8. The outflowing stream of sewage entrains solid particles which have settled in the lower part of the tank 2. When the level of sewage in the agitating chamber of the tank 1 drops below the lower end of the electrode 18, the control system closes the valve 13 and opens the valve 12 in the inlet 7 so that the apparatus can receive a fresh batch of untreated sewage.

If the sewage is to be evacuated by the pump 5, the control system closes the valve 11 in the conduit 4 and opens the valve 14 in the outlet 9. The pump 5 forces sewage to flow from the tank 2 and to escape through the outlet 9. Solids which accumulate in the tank 2 are then evacuated by attendants, either regularly or at irregular intervals.

The apparatus of my invention can bring about highly satisfactory disinfection of sewage with relatively small amounts of disinfectant. It was found that 20–30 grams of active chlorine or 200 cubic centimeters of sodium hypochlorite will suffice for complete disinfection of one cubic meter of sewage. This is considerably less than in presently known sewage treating plants. Furthermore, the time required for treatment of a batch of sewage and the reaction time (actual contact of disinfectant with sewage in the hydraulic circuit) is very short so that the apparatus can treat successive batches of sewage at frequent intervals. Despite its high output, the apparatus is very compact and comprises a relatively small number of simple parts. Still further, the apparatus can be installed in very small areas or it may be assembled in such a way that its parts occupy two or more areas located close to or at a considerable distance from each other. The apparatus can be assembled at the locale of use and can be installed in basements or other areas which are available in a ship, hospital or another institution which produces large quantities of sewage. The operation can be interrupted and restarted as often as desired without any damage to the apparatus.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A process of treating sewage with a disinfectant, particularly with chlorine, comprising the steps of circulating the sewage to be treated along an endless path including an aerating chamber and a settling chamber, both said chambers being included in and forming part of said endless path; admitting sewage into said endless path via said settling chamber and carrying out said circulating of the thus admitted sewage along said endless path through said aerating chamber and back into said settling chamber; agitating said sewage in said aerating chamber so as to mix said sewage with air; measuring a predetermined amount of disinfectant; and suddenly adding the total of said predetermined amount of disinfectant into the mixture of air and sewage in said aerating chamber.

2. A process as defined in claim 1 for treatment of sewage which contains comminutible solid ingredients, further comprising the step of comminuting the solid ingredients at least during admission of sewage into said aerating chamber.

3. Apparatus for treating sewage with a disinfectant, particularly with chlorine, comprising a hydraulic circuit defining an endless path for sewage and including a first tank having an aerating chamber which forms a first portion of said path and a second tank having a second chamber forming a second portion of said path; circulating means for effecting admission of sewage into said circuit via said second tank and for circulating the thus admitted sewage in said path; agitating means provided in said first tank to agitate the sewage in said aerating chamber and to mix such sewage with air; means for measuring a predetermined amount of disinfectant; and means for suddenly adding the total of said predetermined amount of disinfectant into the mixture of air and sewage in said aerating chamber.

4. Apparatus for treating sewage with a disinfectant, particularly with chlorine, comprising a hydraulic circuit defining an endless path for sewage and including a first tank having an aerating chamber which forms a first portion of said path, a second tank having a second chamber forming a second portion of said path, and conduit means connecting upper portions of said tanks to each other; circulating means for effecting admission of sewage into said circuit via said second tank and for circulating the thus admitted sewage in said path, said circulating means comprising a pump arranged to force sewage through said conduit means form the upper portion of said second tank to the upper portion of said first tank and a second conconduit means from the upper portion of said second tank to the upper portion of said second tank; agitating means in said first tank to agitate the sewage in said aerating chamber and to mix such sewage with air; and means for suddenly adding a measured amount of disinfectant into the mixture of air and sewage in said aerating chamber.

5. Apparatus as defined in claim 4, wherein said second tank comprises sealable inlet means for admission of untreated sewage into said circuit.

6. Apparatus as defined in claim 4, wherein the first conduit means are sealable by a valve and connected to a sealable outlet, the second conduit means being sealable by a valve, and the second tank being connected to a seal able inlet for untreated sewage and at its lowermost part to a sealable outlet.

7. Apparatus as defined in claim 4, wherein said circuit further comprises conduits connecting said tanks and valve means provided in said conduits.

8. Apparatus as defined in claim 4 for treatment of sewage which contains comminutible solid ingredients, further comprising comminuting means provided in said circuit to break up the solid ingredients in circulating sewage.

9. Apparatus as defined in claim 8, wherein said comminuting means forms part of said circulating means.

10. Apparatus as defined in claim 8, wherein said second conduit means has a sealable outlet.

References Cited

UNITED STATES PATENTS

| 2,724,837 | 11/1955 | McPherson | 4—10 |
| 3,386,668 | 6/1968 | Shepherd | 241—46 |

FOREIGN PATENTS

| 1,140,833 | 12/1962 | Germany. |

MICHAEL E. ROGERS, Primary Examiner

U.S. Cl. X.R.

210—62, 152, 206, 262; 4—10; 241—46